United States Patent
Jitsukawa et al.

(10) Patent No.: US 8,634,372 B2
(45) Date of Patent: Jan. 21, 2014

(54) PILOT SIGNAL TRANSMISSION METHOD AND MOBILE COMMUNICATION SYSTEM

(75) Inventors: Daisuke Jitsukawa, Kawaski (JP); Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 306 days.

(21) Appl. No.: 12/893,379

(22) Filed: Sep. 29, 2010

(65) Prior Publication Data

US 2011/0013585 A1    Jan. 20, 2011

Related U.S. Application Data

(62) Division of application No. 11/738,579, filed on Apr. 23, 2007, now Pat. No. 7,808,884.

(30) Foreign Application Priority Data

Oct. 26, 2006  (JP) .................................. 2006-290881

(51) Int. Cl.
 *H04W 40/00* (2009.01)
(52) U.S. Cl.
 USPC ......................................................... 370/330
(58) Field of Classification Search
 USPC ......... 370/203, 208, 210, 330, 328, 337, 344, 370/345
 See application file for complete search history.

(56) References Cited

U.S. PATENT DOCUMENTS

| | | | |
|---|---|---|---|
| 7,508,842 B2 * | 3/2009 | Baum et al. .................. | 370/468 |
| 8,009,775 B2 * | 8/2011 | Murthy et al. ................ | 375/344 |
| 2006/0045001 A1 * | 3/2006 | Jalali ............................. | 370/208 |
| 2006/0250935 A1 | 11/2006 | Hamamoto et al. | |
| 2007/0189406 A1 * | 8/2007 | Kim et al. ..................... | 375/260 |
| 2007/0263738 A1 | 11/2007 | Jitsukawa et al. | |
| 2008/0049851 A1 * | 2/2008 | Nangia et al. ................. | 375/260 |

OTHER PUBLICATIONS

"Multiplexing Method for Orthogonal Reference Signals for E-UTRA Uplink," Agenda Item 11.2.1, R1-061193, 3GPP TSG-RAN WG1 Meeting #45, Shanghai, China, May 8-12, 2006.
"Frequency domain channel-dependent scheduling employing an adaptive transmission bandwidth for pilot channel in uplink single-carrier FDMA radio access", Vehicular Technology Conference, May 7-10, 2006.
Korean Intellectual Property Office, Office Action dated May 26, 2008, for corresponding Korean Patent Application No. 10-2007-45522.

* cited by examiner

*Primary Examiner* — Jae Y Lee
*Assistant Examiner* — Jean F Voltaire
(74) *Attorney, Agent, or Firm* — Fujitsu Patent Center

(57) ABSTRACT

A method of transmitting pilot signals for channel compensation in a mobile communication system is disclosed. In the disclosed method, a first pilot signal and a second pilot signal are time-division multiplexed together with a data signal of a user into a time-division multiplexed signal which data signal is assigned a certain bandwidth; the time-division multiplexed signal is frequency-division multiplexed together with time division multiplexed signals of other users when wirelessly transmitted; and the first pilot signal is assigned a bandwidth larger than the bandwidth of the data signal and the second pilot signal is assigned a bandwidth smaller than the bandwidth of the data signal.

10 Claims, 12 Drawing Sheets

US 8,634,372 B2

PILOT SIGNAL TRANSMISSION METHOD AND MOBILE COMMUNICATION SYSTEM

BACKGROUND OF THE INVENTION

1. Field of the Invention

The present invention generally relates to a pilot signal transmission method and a mobile communication system, and more particularly relates to a pilot signal transmission method and a mobile communication system where a pilot signal for channel compensation is time-division multiplexed together with a data signal of a user, which data signal is assigned a certain bandwidth and to be wirelessly transmitted based on DFT-spread-OFDM, into a time-division multiplexed signal, the time-division multiplexed signal is frequency-division multiplexed together with time-division multiplexed signals of other users into a frequency-division multiplexed signal, and the frequency-division multiplexed signal is transmitted.

2. Description of the Related Art

In the uplink of the Evolved UTRA (enhanced system of W-CDMA) standard regarding the enhancement of the next generation mobile communication system, the use of DFT-spread-OFDM (orthogonal frequency division multiplexing) is being discussed as a wireless access technology. In DFT-spread-OFDM, a data signal of a user is assigned a certain frequency bandwidth (resource unit) and frequency-division multiplexed together with data signals of other users. DFT-spread-OFDM employs a single-carrier transmission method instead of a multi-carrier transmission method employed in, for example, OFDM and therefore provides a lower peak-to-average power ratio (PAPR). Also, DFT-spread-OFDM employs frequency-domain signal processing and therefore makes it possible to flexibly arrange components of a single-carrier signal in the frequency domain.

FIGS. 11A and 11B are drawings illustrating exemplary signal mappings in the frequency domain. In FIGS. 11A and 11B, a resource block (RB) indicates a minimum unit of frequency bandwidth assignable to a mobile station within the entire frequency bandwidth of a system. In a localized mapping shown in FIG. 11A, adjacent subcarriers (SC) are combined as an RB. In a distributed mapping shown in FIG. 11B, SCs apart from each other are combined as an RB. In either case, mobile stations use different RBs and therefore multiuser interference within a cell can be effectively avoided; in other words, frequency use efficiency is high.

In the Evolved UTRA standard, the use of the Zadoff-Chu sequence (hereafter called ZC sequence), a variation of the constant amplitude and zero auto correlation (CAZAC) sequence, for the pilot signal is being considered. When the sequence length N is an odd number, a ZC sequence is expressed by the following formula (1):

$$c_k(n) = \exp\left[-\frac{j2\pi k}{N}\left(qn + n\frac{n+1}{2}\right)\right] (n = 0, \ldots, N-1) \quad (1)$$

When the sequence length N is an even number, a ZC sequence is expressed by the following formula (2):

$$c_k(n) = \exp\left[-\frac{j2\pi k}{N}\left(qn + \frac{n^2}{2}\right)\right] (n = 0, \ldots, N-1) \quad (2)$$

In the above formulas, q indicates an integer and k indicates a sequence number.

When designing a pilot signal, multicell interference must first be taken into account. In a multicell environment, instead of multiplying ZC sequences with a scramble code unique to each cell, a set of ZC sequences with low cross-correlation are generated and assigned to the pilot signals of each cell. In this case, to maximize the number of sequences k in the set of ZC sequences and thereby to maximize the flexibility in assigning ZC sequences to each cell, the sequence length N must be a prime number. Secondly, to obtain channel estimates for the frequency band assigned to a data signal, a pilot signal is preferably assigned the same bandwidth as that of the data signal.

The ZC sequence is a variation of the CAZAC sequence and therefore has constant amplitude in the time domain and the frequency domain and zero autocorrelation except when its phase difference is 0. Therefore, using ZC sequences as pilot signals makes it possible to keep the PAPR of a transmitted signal substantially low. Also, using ZC sequences as pilot signals makes it possible for a receiving end to substantially reduce the fluctuation in the SNR of channel estimates in the frequency domain between subcarriers.

When using ZC sequences as pilot signals, if the pilot signals are multiplied with a scramble code unique to each cell as in the case of data signals, the properties of the ZC sequences that are peculiar to a CAZAC sequence variation are lost. Therefore, when using ZC sequences as pilot signals for uplink transmission in a cellular system, rather than multiplying ZC sequences with a scramble code unique to each cell, it is preferable to generate multiple ZC sequences with low cross-correlation by changing the sequence number k and to assign the generated ZC sequences to each cell.

To improve the flexibility (number of replications) in assigning ZC sequences to each cell, it is preferable to be able to efficiently generate ZC sequences with low cross-correlation. It is known that when the sequence length N is a prime number, N−1 number of ZC sequences with low cross-correlation can be generated. For this reason, it is proposed to use ZC sequences having prime sequence lengths N as pilot signals for uplink transmission in a cellular system.

FIG. 12 is a drawing illustrating an exemplary mapping of pilot and data signals in the time and frequency domains and used to describe problems in a conventional technology. In FIG. 12, for brevity, it is assumed that the intervals of subcarriers for pilot signals and data signals are the same. Data signal and pilot signal regions are time-division multiplexed and one pilot signal region is provided before and after one data signal region. According to RB assignment information, RB1 and RB2 are assigned to the data signal region of mobile station A and the same frequency band as that of the data signal region is assigned to the pilot signal regions.

[Non-patent document 1] "Multiplexing Method for Orthogonal Reference Signals for E-UTRA Uplink" Agenda Item: 11.2.1, R1-061193, 3GPP TSG-RAN WG1 Meeting No. 45, Shanghai, China, 8-12 May, 2006

However, while the number of subcarriers for a data signal is an integral multiple of the number of subcarriers in an RB, the number of subcarriers (sequence length N of a ZC sequence) for a pilot signal must be a prime number as described above. Therefore, the frequency bandwidths used by a data signal and a pilot signal are basically different. Also, it is necessary to prevent interference between pilot signals of mobile stations that use adjacent RBs.

One way to solve the above problems is to set the number of subcarriers (sequence length of a ZC sequence) for a pilot signal to the largest prime number within the bandwidth of a data signal. In FIG. 12, 13 subcarriers, where 13 is the largest prime number within the frequency bandwidth 16 (unit of bandwidth is omitted here) of the data signal, are assigned to each of the pilot signals. In this case, however, the pilot signals do not cover the frequency bands corresponding to both ends of the data signal. Therefore, the channel estimates for the one rightmost subcarrier and the two leftmost subcarriers of the data signal must be extrapolated.

There are two major factors that affect the accuracy of channel estimation at a receiving unit of a base station. The first factor is thermal noise components and interference signal components contained in a received signal. The second factor is the accuracy of interpolation/extrapolation by a time and frequency interpolation/extrapolation unit. Channel distortion becomes greater in the time direction in proportion to the traveling speed of a mobile station and in the frequency direction in proportion to the delay spread. When channel distortion is low, interpolation/extrapolation can be performed accurately to a certain extent. However, since channel distortion occurs in a very complicated manner, it is difficult to accurately perform interpolation/extrapolation when channel distortion is high. Also, in urban areas, normally, channel distortion is greater and more complicated in the frequency direction than in the time direction, and an extrapolation method provides less accurate results than an interpolation method.

As described above, when a ZC sequence with a prime number sequence length is used as a pilot signal for uplink transmission, the bandwidth of the pilot signal may become different from that of a data signal, making it necessary to extrapolate channel estimates in the frequency direction. This, in turn, greatly reduces the accuracy of channel estimation and thereby degrades the reception characteristics of a data signal. On the other hand, making the bandwidth of a pilot signal larger than that of a data signal may cause interference between pilot signals of different users.

SUMMARY OF THE INVENTION

The present invention provides a pilot signal transmission method and a mobile communication system that substantially obviate one or more problems caused by the limitations and disadvantages of the related art.

Embodiments of the present invention provide a pilot signal transmission method and a mobile communication system that enable accurate channel estimation.

An embodiment of the present invention provides a method of transmitting pilot signals in a mobile communication system, which method includes the steps of time-division multiplexing a first pilot signal and a second pilot signal for channel compensation together with a data signal of a user, which data signal is assigned a certain bandwidth and to be wirelessly transmitted based on DFT-spread-OFDM, into a time-division multiplexed signal; frequency-division multiplexing the time-division multiplexed signal together with time-division multiplexed signals of other users into a frequency-division multiplexed signal; and transmitting the frequency-division multiplexed signal; wherein the first pilot signal is assigned a bandwidth larger than the bandwidth assigned to the data signal and the second pilot signal is assigned a bandwidth smaller than the bandwidth assigned to the data signal; and the first pilot signal and the second pilot signal are multiplexed along a time axis.

Another embodiment of the present invention provides a method of transmitting pilot signals in a mobile communication system, which method includes the steps of time-division multiplexing a first pilot signal and a second pilot signal for channel compensation together with a data signal of a user, which data signal is assigned a certain bandwidth and to be wirelessly transmitted based on DFT-spread-OFDM, into a time-division multiplexed signal; frequency-division multiplexing the time-division multiplexed signal together with time-division multiplexed signals of other users into a frequency-division multiplexed signal; and transmitting the frequency-division multiplexed signal; wherein each of the first pilot signal and the second pilot signal is composed of a sequence having a sequence length that is the largest prime number within the bandwidth assigned to the data signal; the first pilot signal is assigned a frequency band starting from one end of the bandwidth assigned to the data signal; the second pilot signal is assigned a frequency band starting from the other end of the bandwidth assigned to the data signal; and the first pilot signal and the second pilot signal are multiplexed alternately along a time axis.

Another embodiment of the present invention provides a method of transmitting a pilot signal in a mobile communication system, which method includes the steps of time-division multiplexing a pilot signal for channel compensation together with a data signal of a user, which data signal is assigned a certain bandwidth and to be wirelessly transmitted based on DFT-spread-OFDM, into a time-division multiplexed signal; frequency-division multiplexing the time-division multiplexed signal together with time-division multiplexed signals of other users into a frequency-division multiplexed signal; and transmitting the frequency-division multiplexed signal; wherein the pilot signal is composed of a sequence having a sequence length that is a prime number; and the bandwidth assigned to the data signal is adjusted to match a bandwidth corresponding to the sequence length.

Another embodiment of the present invention provides a mobile communication system including a base station and at least one mobile station where a pilot signal for channel compensation is time-division multiplexed together with a data signal of the mobile station, which data signal is assigned a certain bandwidth and to be wirelessly transmitted between the base station and the mobile station based on DFT-spread-OFDM, into a time-division multiplexed signal, the time-division multiplexed signal is frequency-division multiplexed together with time-division multiplexed signals of other mobile stations in the mobile communication system into a frequency-division multiplexed signal, and the frequency-division multiplexed signal is transmitted, wherein the base station is configured to transmit information over a downlink control channel to the mobile station which information includes a bandwidth to be assigned to the data signal of the mobile station; the mobile station is configured to multiplex a first pilot signal composed of a sequence having a sequence length that is the smallest prime number exceeding the bandwidth assigned to the data signal of the mobile station and a second pilot signal composed of a sequence having a sequence length that is the largest prime number within the bandwidth assigned to the data signal of the mobile station alternately along a time axis in such a manner that either of the first pilot signal and the second pilot signal does not overlap a pilot signal transmitted at substantially the same timing from an adjacent one of the other mobile stations a data signal of which adjacent one of the other mobile stations is assigned a frequency band adjacent to that assigned to the data signal of the mobile station.

Still another embodiment of the present invention provides a mobile communication system including a base station and at least one mobile station where a pilot signal for channel compensation is time-division multiplexed together with a data signal of the mobile station, which data signal is assigned a certain bandwidth and to be wirelessly transmitted between the base station and the mobile station based on DFT-spread- OFDM, into a time-division multiplexed signal, the time-division multiplexed signal is frequency-division multiplexed together with time-division multiplexed signals of other mobile stations in the mobile communication system into a frequency-division multiplexed signal, and the frequency-division multiplexed signal is transmitted, wherein the base station is configured to transmit information over a downlink control channel to the mobile station which information includes a bandwidth to be assigned to the data signal of the mobile station and a priority to determine a sequence length of the pilot signal; and the mobile station is configured to, when the priority is high, multiplex a first pilot signal composed of a sequence having a sequence length that is the smallest prime number exceeding the bandwidth assigned to the data signal of the mobile station.

DETAILED DESCRIPTION OF THE PREFERRED EMBODIMENTS

1. First Embodiment

Figure 1:
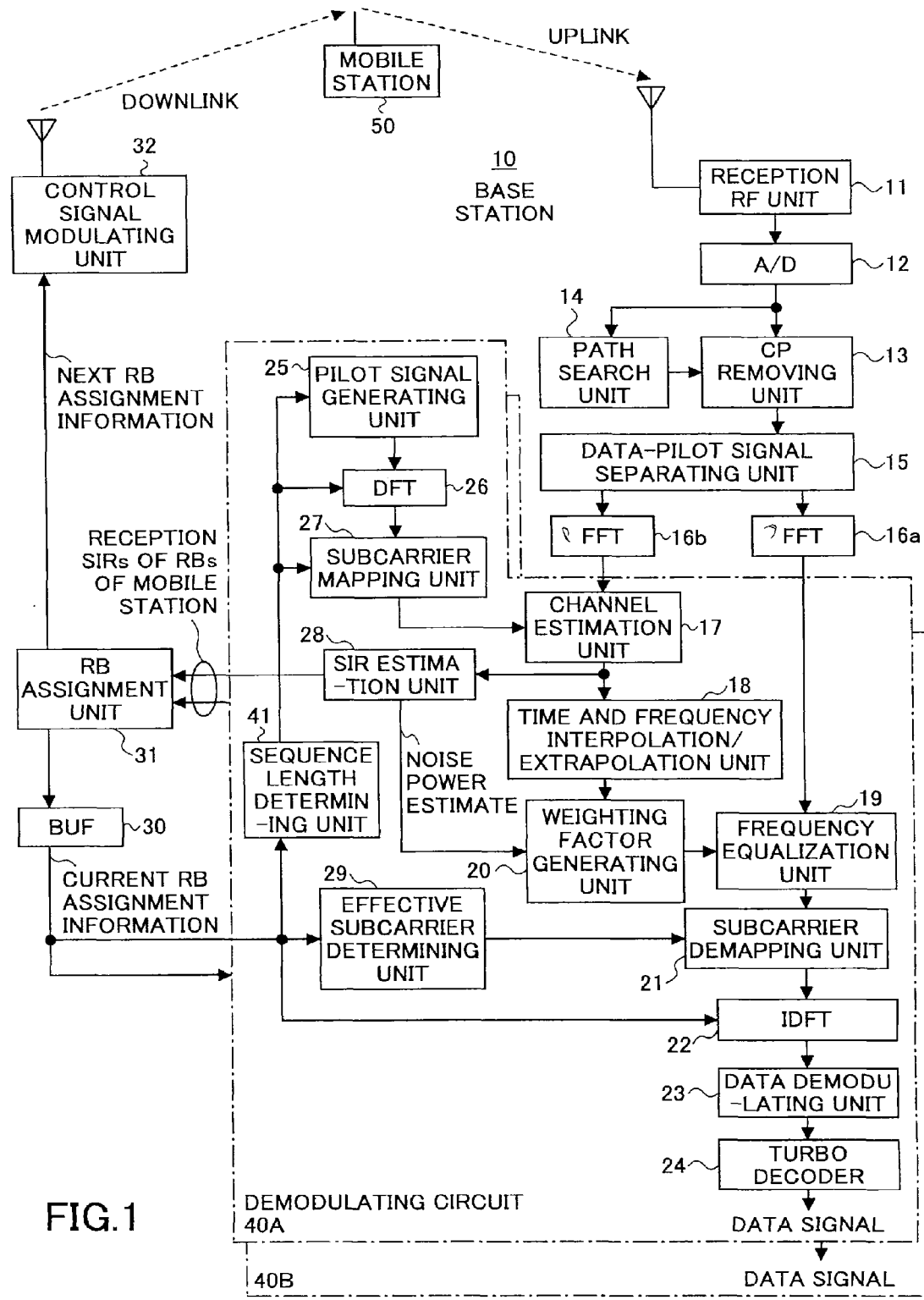
FIG. 1 is a block diagram illustrating an exemplary configuration of an exemplary receiving unit of a base station according to a first embodiment of the present invention.
Figure 2:
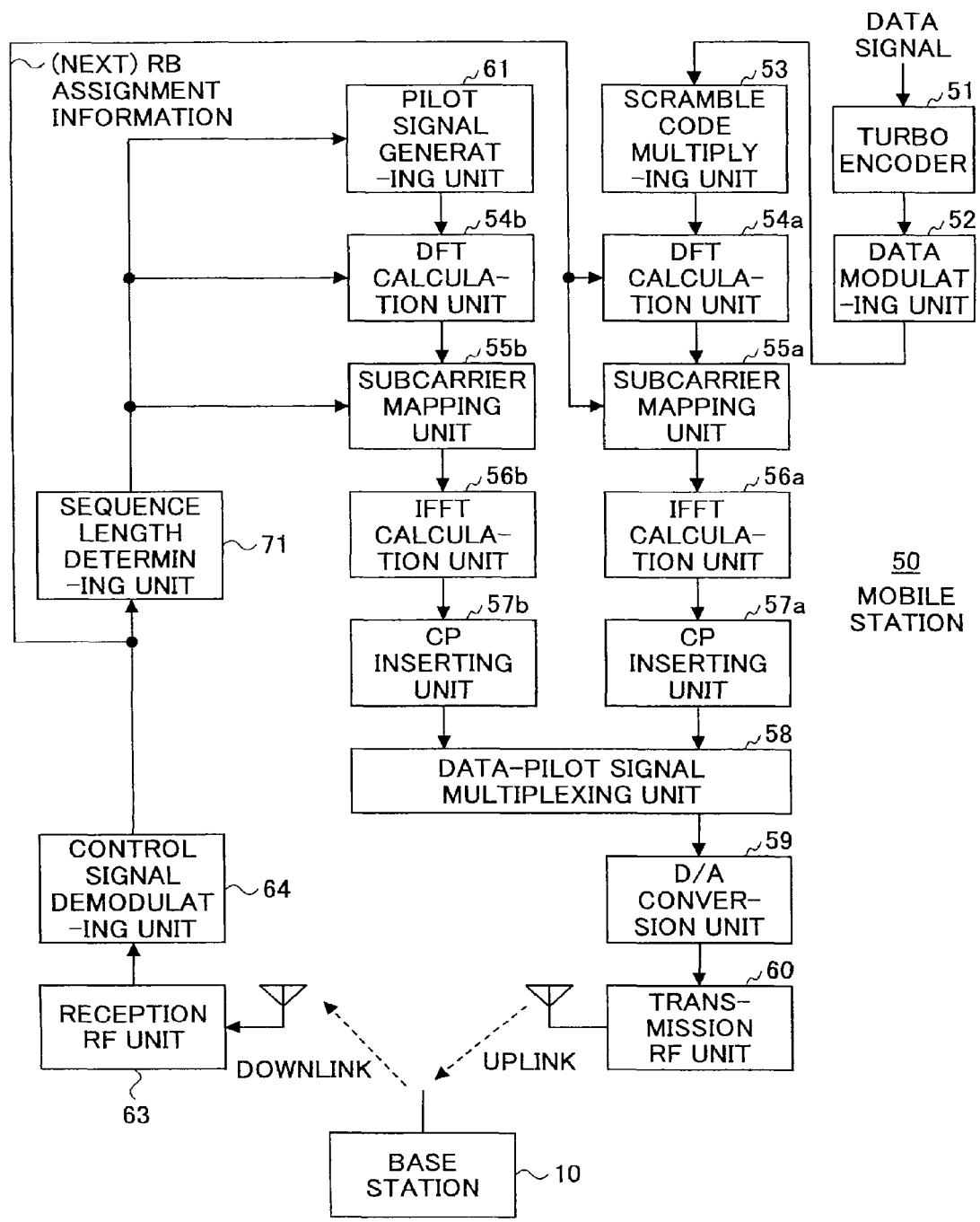
FIG. 2 is a block diagram illustrating an exemplary configuration of an exemplary transmitting unit of a mobile station according to the first embodiment of the present invention.

Preferred embodiments of the present invention are described below with reference to the accompanying drawings. In the drawings, the same reference numbers are used for the same or corresponding parts. FIG. 1 and FIG. 2 are drawings illustrating an exemplary mobile communication system based on DFT-spread-OFDM according to a first embodiment of the present invention.

FIG. 1 is a block diagram illustrating an exemplary configuration of an exemplary receiving unit of a base station 10.

An uplink radio signal from a mobile station 50 is quadrature-demodulated by a reception RF unit 11 and thereby converted into a baseband signal, and the baseband signal is converted from analog to digital by an A/D converting unit 12. A path search unit 14 performs a correlation calculation in the time domain between the A/D converted signal (received signal) and a replica of a transmitted pilot signal and thereby detects a reception timing (starting point of an effective signal component) of each path. A CP removing unit 13 removes cyclic prefixes (CP) from the received signal based on the reception timing of path 1 and thereby extracts the effective signal component. A data-pilot signal separating unit 15 separates pilot signals and a data signal that are time-division multiplexed in the received signal.

The pilot signals are converted from the time domain into the frequency domain by an FFT unit 16b and sent to one of demodulating circuits 40A, 40B, . . . each of which handles one mobile station at a time. In the demodulating circuit 40A, for example, a sequence length determining unit 41 determines the sequence length of each of the pilot signals and its mapping to subcarriers based on the current RB assignment information of the mobile station 50 and a pilot signal frequency band assignment rule described later. Based on the determined information, a pilot signal generating unit 25 generates a replica of the transmitted pilot signal in the time domain and a DFT calculation unit 26 converts the time domain pilot signal into a frequency domain pilot signal. Then, a subcarrier mapping unit 27 maps the frequency domain pilot signal onto subcarriers assigned to the mobile station 50.

A channel estimation unit 17 performs a correlation calculation in the frequency domain between the received pilot signal and the replica of the transmitted pilot signal for each of the subcarriers where the frequency domain pilot signal is mapped and thereby estimates the channel distortion in the frequency domain for each of the subcarriers.

An SIR estimation unit 28 estimates reception SIRs for the RBs assigned to the data signal based on the channel estimates obtained by the channel estimation unit 17. In estimating the reception SIR for an RB, the channel estimate of subcarriers corresponding to the RB is used. A channel estimate is expressed by a complex number. "S" in SIR indicates a desired signal power and is obtained by adding the square of the real part of the channel estimate and the square of the imaginary part of the channel estimate. "I" in SIR indicates an interference signal power and is the variance of multiple symbols. A reception SIR estimate is the ratio of the desired signal power S to the interference signal power I. The SIR estimation unit 28 also calculates a noise power estimate used by a weighting factor generating unit 20 described later. More specifically, the SIR estimation unit 28 calculates a noise power estimate by averaging the obtained interference signal powers I of the RBs assigned to the data signal.

An RB assignment unit 31 assigns RBs (generates the next RB assignment information) used for the next transmission of a data signal from the mobile station 50 based on the obtained reception SIR estimates. For example, the RB assignment unit 31 assigns RBs having reception SIR estimates greater than a certain threshold. Assigning RBs with high reception quality results in improving the throughput of an entire cell. A control signal modulating unit 32 maps the next RB assignment information obtained by the RB assignment unit 31 onto a control signal and feeds the control signal back to the mobile station 50.

The next RB assignment information is used as the current RB assignment information by the mobile station 50 when sending a next data signal. Also, the next RB assignment information is used as the current RB assignment information by the base station 10 when receiving the next data signal. The next RB assignment information generated by the RB assignment unit 31 is delayed by a buffer 30 and thereby is used as the current RB assignment information by the base station 10.

When interpolation/extrapolation of the channel estimates is necessary, a time and frequency interpolation/extrapolation unit 18 interpolates/extrapolates in the time and frequency directions (for example, by linear interpolation) the channel estimates of some of the subcarriers (FFT blocks) in a subframe, which channel estimates are obtained by the channel estimation unit 17, and thereby obtains the channel estimates of all of the subcarriers (FFT blocks) in the subframe.

The weighting factor generating unit 20 calculates an MMSE weight used by a frequency equalization unit 19. For example, when the channel estimate is H and the noise power estimate is N, the MMSE weight W for a subcarrier or an FFT block is obtained by the following formula (3):

$$W = \frac{H^*}{|H|^2 + N} \quad (3)$$

In formula (3), the symbol * indicates a complex conjugate.

The received data signal is converted from the time domain into the frequency domain by an FFT unit 16a and sent to one of demodulating circuits 40A, 40B, ... each of which handles one mobile station at a time. In the demodulating circuit 40A, for example, the output from the FFT unit 16a is frequency-equalized by the frequency equalization unit 19. More specifically, the FFT unit 16a multiplies the received data signal with the corresponding MMSE weight for each subcarrier or FFT block.

An effective subcarrier determining unit 29 determines the positions of effective subcarriers used by the data signal based on the current RB assignment information. The RB assignment information is obtained from the RB assignment unit 31 via the buffer 30. A subcarrier demapping unit 21 extracts the data signal in the RBs assigned to the mobile station 50 from the received signal in the FFT blocks. An IDFT calculation unit 22 converts the data signal from the frequency domain to the time domain and a data demodulating unit 23 demodulates the converted data signal. Then, a turbo decoder 24 performs error-correction decoding on the demodulated data signal and thereby obtains a decoded data signal. The demodulating circuit 40B also functions in the same manner as described above.

FIG. 2 is a block diagram illustrating an exemplary configuration of an exemplary transmitting unit of a mobile station. A downlink radio signal from the base station 10 is received and converted into a baseband signal by a reception RF unit 63. A control signal demodulating unit 64 demodulates the control signal fed back from the base station 10 and extracts the next RB assignment information including the number of assigned RBs and RB numbers. The next RB assignment information fed back from the base station 10 is used as the current RB assignment information by the mobile station 50 when sending the next data signal.

A turbo encoder 51 performs error-correction encoding on a transmission data signal of the mobile station 50 and a data modulating unit 52 modulates the encoded data signal. A scramble code multiplying unit 53 multiplies the modulated data signal with a scramble code that is unique to each cell to reduce inter-cell interference. A DFT calculation unit 54a performs discrete Fourier transform (DFT) on the multiplied data signal symbol by symbol according to the number of assigned RBs and thereby converts the multiplied data signal from the time domain to the frequency domain. For example, when the number of subcarriers in an RB is Nc and the number of assigned RBs is NRB, a symbol is expressed by Nc×NRB. A subcarrier mapping unit 55a maps the data signal output from the DFT calculation unit 54a onto subcarriers in a localized mapping manner based on the RB assignment information in the frequency domain. An IFFT calculation unit 56a converts the mapped data signal from the frequency domain back again to the time domain. A CP inserting unit 57a inserts a cyclic prefix (CP) between samples (IFFT blocks) output from the IFFT calculation unit 56a.

A sequence length determining unit 71 determines the sequence length of a pilot signal and the mapping of the pilot signal to subcarriers based on the RB assignment information from the base station 10 and the pilot signal frequency band assignment rule that is the same as that of the base station 10. Based on the determined information, a pilot signal generating unit 61 generates a pilot signal in the time domain and a DFT calculation unit 54b converts the time domain pilot signal into a frequency domain pilot signal. Then, a subcarrier mapping unit 55b maps the frequency domain pilot signal onto the subcarriers assigned to the mobile station 50. The exemplary transmitting unit of the mobile station 50 may be configured to periodically transmit a pilot signal for use by the base station 10 to measure a channel quality indicator (CQI) of each RB. In this case, the subcarrier mapping unit 55b maps the frequency domain pilot signal output from the DFT calculation unit 54b over the entire frequency band in a distributed mapping manner. An IFFT calculation unit 56b converts the mapped pilot signal from the frequency domain back again to the time domain. A CP inserting unit 57b inserts a CP between samples output from the IFFT calculation unit 56b.

A data-pilot signal multiplexing unit 58 time-division multiplexes the obtained data and pilot signals into a time-division multiplexed signal and a D/A conversion unit 59 converts the time-division multiplexed signal from digital to analog. Then, a transmission RF unit 60 performs quadrature modulation on the converted signal, in other words, converts the baseband signal into a radio frequency signal, and transmits the radio frequency signal from a transmitting antenna.

As described above, in the exemplary mobile communication system, a data signal and pilot signals for channel compensation are time-division multiplexed into a time-division multiplexed signal, and the time-division multiplexed signal is frequency-division multiplexed with time-division multiplexed signals from other users when wirelessly transmitted. In this case, downlink signals from the base station 10 to the mobile stations 50 are frequency-division multiplexed in the base station 10 and uplink signals from the mobile stations 50 to the base station 10 are frequency-division multiplexed in the air.

Figure 3:
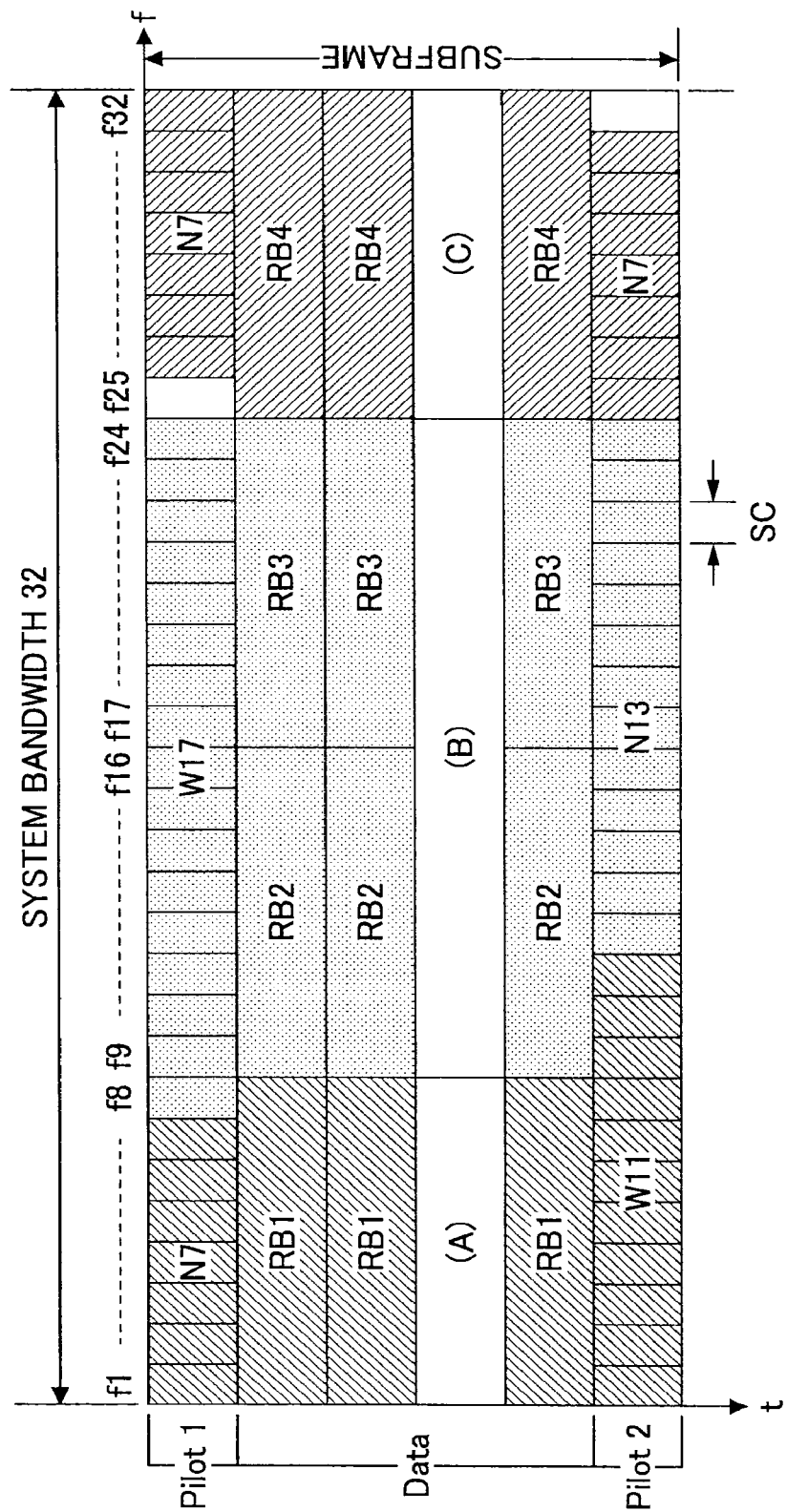
FIG. 3 is a drawing illustrating an exemplary mapping of pilot signals according to an embodiment of the present invention.

FIG. 3 is a drawing illustrating an exemplary mapping of pilot signals according to an embodiment of the present invention. In FIG. 3, the frequency bandwidth (32) of a system (system bandwidth) is divided into three frequency bands used by three mobile stations A through C. As a general rule, the sequence length of a pilot signal is preferably determined so that the pilot signal uses the bandwidth corresponding to that assigned to a data signal of the user as much as possible and the pilot signal does not overlap (interfere with) another pilot signal of an adjacent data signal (user). Also, the sequence length of a pilot signal is preferably determined so as not to exceed the system bandwidth. In this embodiment, a pilot signal has constant signal amplitude in the time and frequency domains and zero autocorrelation except when its phase difference is 0. For example, a pilot signal may be composed of a sequence of frequency components obtained by discrete Fourier transforming a Zadoff-Chu sequence having a prime sequence length. The Zadoff-Chu sequence is a variation of the constant amplitude and zero auto correlation (CAZAC) sequence. An exemplary mapping of pilot signals is described below.

In FIG. 3, RB1 (subcarriers (SCs) f1 through f8) is assigned to user A, RB2 and RB3 (SCs f9 through f24) are assigned to user B, and RB4 (SCs f25 through f32) is assigned to user C. A sequence length of 7 that is the largest prime number within the bandwidth (8) of the data signal of user A is assigned to the leading pilot signal 1 of user A, and a sequence length of 11 that is the smallest prime number exceeding the bandwidth (8) of the data signal is assigned to the succeeding pilot signal 2. Symbol N (narrow) indicates the narrower bandwidth assigned to one of the pilot signals of a user and symbol W (wide) indicates the wider bandwidth assigned to the other one of the pilot signals. Exemplary prime numbers are shown in FIG. 10B.

Sequence lengths assigned to the pilot signals of adjacent user B are complementary to those assigned to the pilot signals of user A. A sequence length of 17 (W17) that is the smallest prime number exceeding the bandwidth (16) of the data signal of user B is assigned to the leading pilot signal 1 of user B, and a sequence length of 13 (N13) that is the largest prime number within the bandwidth (16) of the data signal is assigned to the succeeding pilot signal 2.

The sum of the sequence lengths (N7 and W17) assigned to the leading pilot signals 1 of users A and B is 24 and equals the sum of the data signal wavelengths (8 and 16) of users A and B. Also, the sum of the sequence lengths (W11 and N13) assigned to the succeeding pilot signals 2 of users A and B is 24 and equals the sum of the data signal wavelengths (8 and 16) of users A and B. Accordingly, the pilot signals of users A and B mapped as described above do not interfere with each other and do not even interfere with pilot signals of other users.

Also, with the exemplary mapping shown in FIG. 3, the channel estimation for SC f8 of the data signal of user A can be accurately performed by using the succeeding pilot signal 2 (W11) of user A, and the channel estimation for SCs f9-f11 of the data signal of user B can be accurately performed by using the leading pilot signal 1 (W17) of user B.

The mapping of pilot signals of user C can be started from scratch since the bandwidth (24) corresponding to that of the data signals of users A and B is filled with their pilot signals. However, since the frequency band of the data signal of user C is positioned at the rightmost part of the system bandwidth, the sequence lengths of pilot signals of user C cannot exceed the data signal bandwidth of 8. For this reason, a sequence length of 7 (N7) that is the largest prime number within the bandwidth (8) of the data signal of user C is assigned to the leading pilot signal 1 of user C, and a sequence length of 7 (N7) that is the largest prime number within the bandwidth (8) of the data signal is also assigned to the succeeding pilot signal 2. In this case, it is preferable to map the leading pilot signal 1 onto subcarriers starting from one end of the frequency band and to map the succeeding pilot signal 2 onto subcarriers starting from the other end of the frequency band as shown in FIG. 3 so that the leading pilot signal 1 and the succeeding pilot signal 2 complement each other. With the exemplary pilot signal mapping shown in FIG. 3, the channel estimation for SC f25 of the data signal of user C can be accurately performed by using the succeeding pilot signal 2 (N7) of user C, and the channel estimation for SC f32 can be accurately performed by using the leading pilot signal 1 (N7) of user C. As described above, embodiments of the present invention eliminate the need to extrapolate channel estimates in the frequency direction and thereby effectively prevent the degradation of accuracy of channel estimation.

Figure 4:
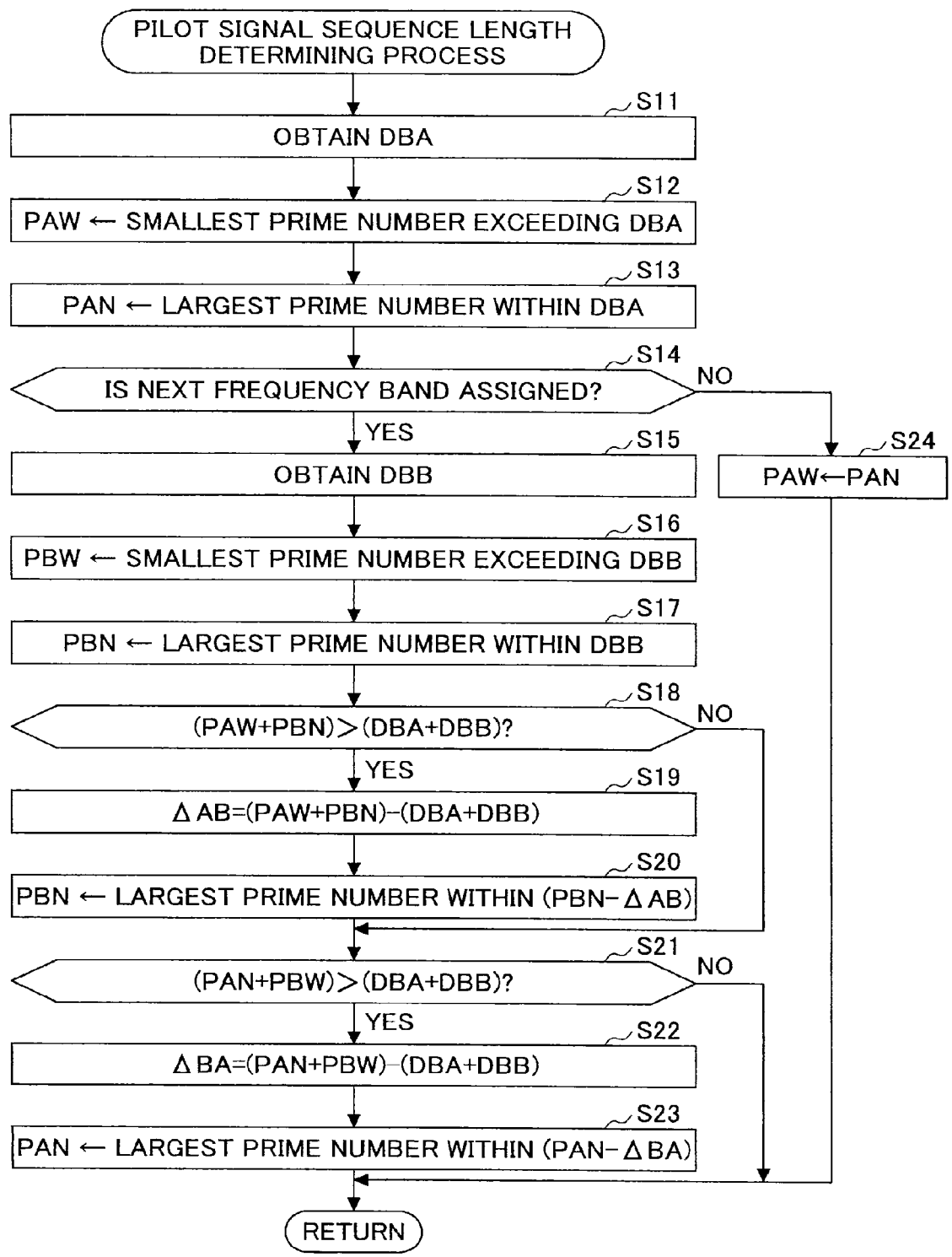
FIG. 4 is a flowchart showing an exemplary process of determining the sequence length of a pilot signal according to an embodiment of the present invention.

FIG. 4 is a flowchart showing an exemplary process of determining the sequence length of a pilot signal performed by the sequence length determining units 41 and 71 according to embodiments of the present invention. In the exemplary process, the sequence length of a pilot signal is determined so that the pilot signal uses the bandwidth corresponding to that assigned to a data signal of the user as much as possible and the pilot signal does not overlap another pilot signal of an adjacent data signal (user). Also, the sequence length of a pilot signal is determined so as not to exceed the system bandwidth.

In step S11, the sequence length determining unit 41 (the sequence length determining unit 41 is used here for descriptive purpose) obtains the data signal bandwidth DBA assigned to user A. In step S12, the sequence length determining unit 41 sets the smallest prime number exceeding the data signal bandwidth DBA in the wider pilot signal sequence length PAW (of the leading pilot signal 1). In step S13, the sequence length determining unit 41 sets the largest prime number within the data signal bandwidth DBA in the narrower pilot signal sequence length PAN (of the succeeding pilot signal 2). In step S14, the sequence length determining unit 41 determines whether the frequency band next to that of the data signal of user A is assigned to a data signal of another user.

If the next frequency band is assigned to another user (user B), in step S15, the sequence length determining unit 41 obtains the data signal bandwidth DBB assigned to user B. In step S16, the sequence length determining unit 41 sets the smallest prime number exceeding the data signal bandwidth DBB in the wider pilot signal sequence length PBW (of the succeeding pilot signal 2). In step S17, the sequence length determining unit 41 sets the largest prime number within the data signal bandwidth DBB in the narrower pilot signal sequence length PBN (of the leading pilot signal 1).

In step S18, the sequence length determining unit 41 determines whether the sum of the sequence lengths (PAW and PBN) of the leading pilot signals 1 of users A and B exceeds the sum of the data signal bandwidths (DBA and DBB). If the sum of the sequence lengths (PAW and PBN) exceeds the sum of the data signal bandwidths (DBA and DBB), in step S19, the sequence length determining unit 41 obtains the exceeding (overlapping) amount ΔAB of the sum of the sequence lengths by the following formula: (PAW+PBN)−(DBA+DBB). In step S20, the sequence length determining unit 41 replaces the narrower pilot signal sequence length PBN of user B with the largest prime number within (PBN−ΔAB). If the sum of the sequence lengths (PAW and PBN) does not exceed the sum of the data signal bandwidths (DBA and DBB), steps 19 and 20 are skipped.

In step S21, the sequence length determining unit 41 determines whether the sum of the sequence lengths (PAN and PBW) of the succeeding pilot signals 2 of users A and B exceeds the sum of the data signal bandwidths (DBA and DBB). If the sum of the sequence lengths (PAN and PBW) exceeds the sum of the data signal bandwidths (DBA and DBB), in step S22, the sequence length determining unit 41 obtains the exceeding (overlapping) amount ΔBA of the sum of the sequence lengths by the following formula: (PAN+PBW)−(DBA+DBB). In step S23, the sequence length determining unit 41 replaces the narrower pilot signal sequence length PAN of user A with the largest prime number within (PAN−ΔBA) and exits the process. If the sum of the sequence lengths (PAN and PBW) does not exceed the sum of the data signal bandwidths (DBA and DBB), steps 22 and 23 are skipped.

In step S14 described above, if the next frequency band is not assigned to another user, the sequence length determining unit 41 replaces the wider pilot signal sequence length PAW with the narrower pilot signal sequence length PAN and exits the process. There are two cases when the result of step S14 becomes No. One case is that the system bandwidth is fully occupied by data signals. The other case is that there is a frequency band available in the system bandwidth but there is no user who uses the frequency band. Step S24 is provided on the assumption that the system bandwidth is fully occupied. When there is a frequency band available in the system bandwidth but there is no user who uses the frequency band, the wider pilot signal sequence length PAW of user A may be used without change. However, the wider pilot signal sequence length PAW must still be within the system bandwidth.

As described above, the exemplary process according to this embodiment handles pilot signals of two users at a time and pilot signals of more than two users can be easily mapped onto subcarriers by repeating the exemplary process. Even when one user is left after repeating the exemplary process, steps 14 and 24 makes it possible to appropriately determine the sequence lengths of the pilot signals of the remaining user.

Figure 5A:
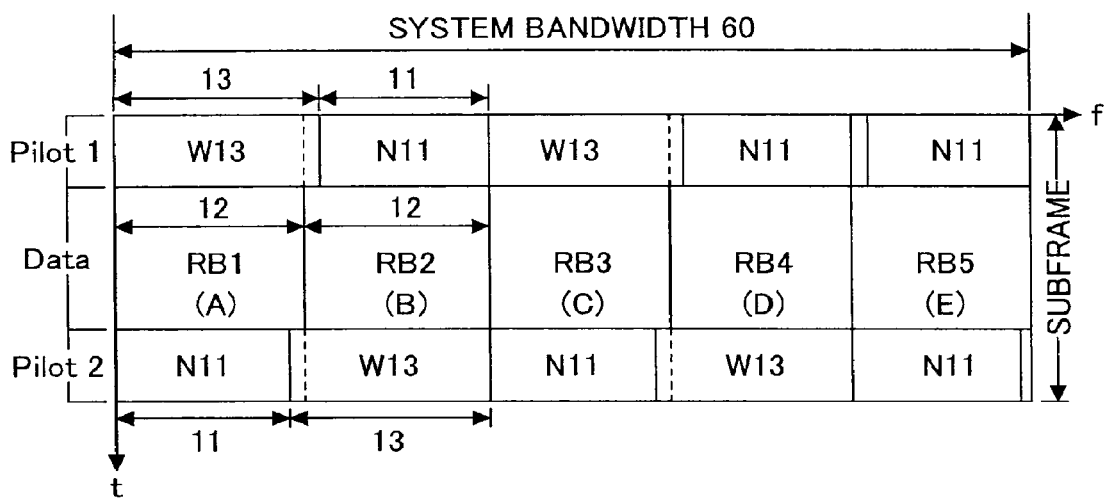
FIGS. 5A and 5B are drawings illustrating other exemplary mappings of pilot signals according to embodiments of the present invention.

FIGS. 5A through 7B are drawings illustrating other exemplary mappings of pilot signals according to embodiments of the present invention. In FIG. 5A, the sequence lengths of pilot signals are determined based on RBs having the same bandwidth. In this example, RB1 through RB5 each having a bandwidth of 12 are assigned to data signals of users A through E, respectively. Also, pilot signals 1 and pilot signals 2 are placed before and after the data signals in the sub-frame.

When the bandwidth of each of RBs is 12, the largest prime number within the RB bandwidth is 11 and the smallest prime number exceeding the RB bandwidth is 13. These prime numbers are used as the sequence lengths N11 and W13. In the example, W13 is assigned to the leading pilot signal 1 of RB1 and N11 is assigned to the succeeding pilot signal 2. The propagation characteristic of the rightmost subcarrier of RB1 can be accurately estimated by using the leading pilot signal 1 (W13).

N11 is assigned to the leading pilot signal 1 of RB2 that is adjacent to RB1 and W13 is assigned to the succeeding pilot signal 2. With this mapping scheme, the propagation characteristic of the leftmost subcarrier of RB2 can be accurately estimated by using the succeeding pilot signal 2 (W13). Also, the leading pilot signals 1 of RB1 and RB2 do not interfere with each other, and the succeeding pilot signals 2 of RB1 and RB2 do not interfere with each other. Further, the sum of the sequence lengths W13 and N11 is 24 and equals the sum of the bandwidths (24) assigned to users A and B. The sequence lengths of pilot signals of RB3 and RB4 can be determined in substantially the same manner as described above.

In the case of RB5, the bandwidth assignable to each of the leading and succeeding pilot signals 1 and 2 is limited to the data signal bandwidth (12) of RB5 alone. Therefore, N11 is assigned to each of the leading and succeeding pilot signals 1 and 2. In this case, it is preferable to map the leading pilot signal 1 onto subcarriers starting from one end of RB5 and to map the succeeding pilot signal 2 onto subcarriers starting from the other end of RB5 as shown in FIG. 5A. With this mapping scheme, the propagation characteristic of the rightmost subcarrier of RB5 can be accurately estimated by using the rightmost symbol of the leading pilot signal 1 (N11), and the propagation characteristic of the leftmost subcarrier of RB5 can be accurately estimated by using the leftmost symbol of the succeeding pilot signal 2 (N11). Also, since the number of subcarriers where the leading pilot signal 1 or the succeeding pilot signal 2 is not mapped is 1, its propagation characteristic may also be obtained by extrapolation.

Figure 5B:
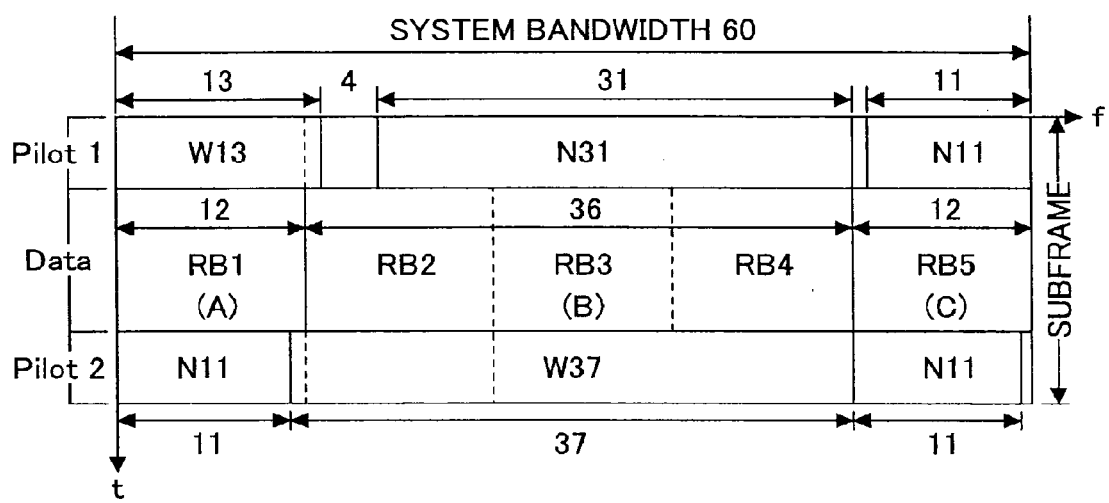

In FIG. 5B, the sequence lengths of pilot signals are determined based on data signal bandwidths assigned to users. In this example, a bandwidth of 12 is assigned to user A, a bandwidth of 36 is assigned to user B, and a bandwidth of 12 is assigned to user C. Also, pilot signals 1 and pilot signals 2 are placed before and after the data signals in the sub-frame. In the case of user A with a data signal bandwidth of 12, W13 is assigned to the leading pilot signal 1 and N11 is assigned to the succeeding pilot signal 2. The propagation characteristic of the rightmost subcarrier of user A can be accurately estimated by using the leading pilot signal 1 (W13).

In the case of user B with a data signal bandwidth of 36, the largest prime number within the data signal bandwidth is 31 and the smallest prime number exceeding the data signal bandwidth is 37. These prime numbers are used as the sequence lengths N31 and W37. In the example, N31 is assigned to the leading pilot signal 1 of user B and W37 is assigned to the succeeding pilot signal 2. With this mapping scheme, the propagation characteristics of the five leftmost subcarriers of user B can be accurately estimated by using the succeeding pilot signal 2 (W37).

Also, the leading pilot signals 1 of users A and B do not interfere with each other, and the succeeding pilot signals 2 of RB1 and RB2 do not interfere with each other. Further, the sum of the sequence lengths N11 and W37 of the succeeding pilot signals 2 is 48 and equals the sum of the bandwidths (48) assigned to users A and B. Although the sequence length N31 of the leading pilot signal 1 of user B is 5 short of the data signal bandwidth (36), the propagation characteristics of the five leftmost subcarriers of user B can be accurately estimated by using the succeeding pilot signal 2 (W37). The leading pilot signal 1 (N31) of user B may also be mapped onto subcarriers in the middle of the available bandwidth so that leftmost and rightmost subcarriers are left blank. The sequence lengths of pilot signals of user C can be determined in substantially the same manner as in the case of RB5 shown in FIG. 5A.

Figure 6:
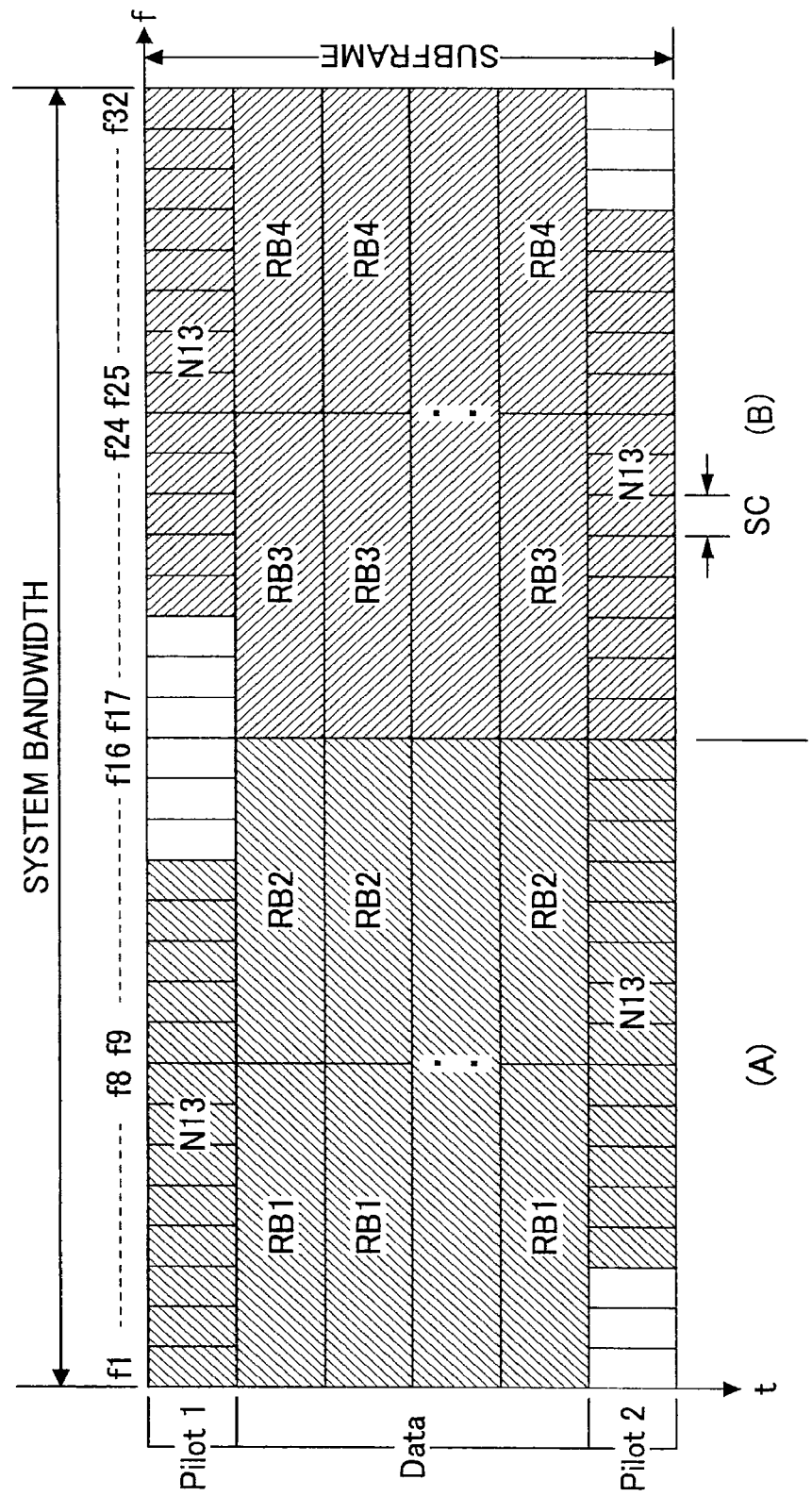
FIG. 6 is a drawing illustrating another exemplary mapping of pilot signals according to an embodiment of the present invention.

In FIG. 6, each of the pilot signals that has a sequence length smaller than the data signal bandwidth is mapped onto subcarriers starting from the left (lower) or right (higher) end of the data signal bandwidth. A data signal bandwidth of 16 is assigned to each of users A and B. In this case, the largest prime number within the data signal bandwidth (16) is 13. In the case of user A, the leading and succeeding pilot signals 1 and 2 each having a sequence length of N13 that is smaller than the data signal bandwidth are mapped onto subcarriers starting from the left end of the data signal bandwidth and onto subcarriers starting from the right end of the data signal bandwidth, respectively. The propagation characteristics of SCs f1 through f3 can be accurately estimated by using the leading pilot signal 1 (N13) and the propagation characteristics of SCs f14 through f16 can be accurately estimated by using the succeeding pilot signal 2 (N13). The succeeding pilot signal 2 (N13) may also be used as the leading pilot signal 1 for the channel estimation of the next data block.

In this example, the leading and succeeding pilot signals 1 and 2 of user B are mapped onto subcarriers in a manner opposite to that of user A. However, the leading and succeeding pilot signals 1 and 2 of user B may be mapped in the same manner as in the case of user A. With the above mapping scheme, the propagation characteristics of SCs f17 through f19 can be accurately estimated by using the succeeding pilot signal 2 (N13) and the propagation characteristics of SCs f30 through f32 can be accurately estimated by using the leading pilot signal 1 (N13). Either pilot signals having the same sequence number k or pilot signals having different sequence numbers k may be used for users A and B.

Figure 7A:
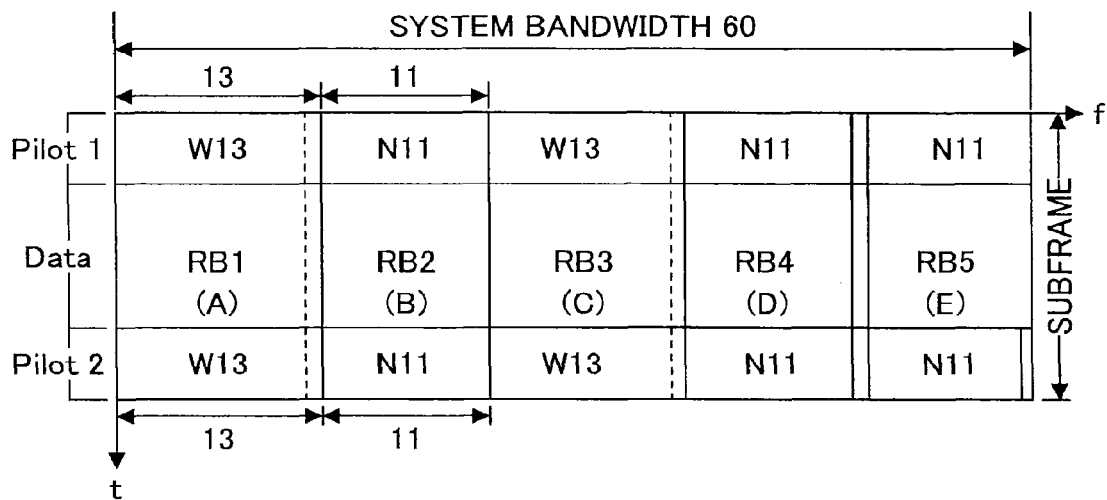
FIGS. 7A and 7B are drawings illustrating other exemplary mappings of pilot signals according to embodiments of the present invention.
Figure 7B:
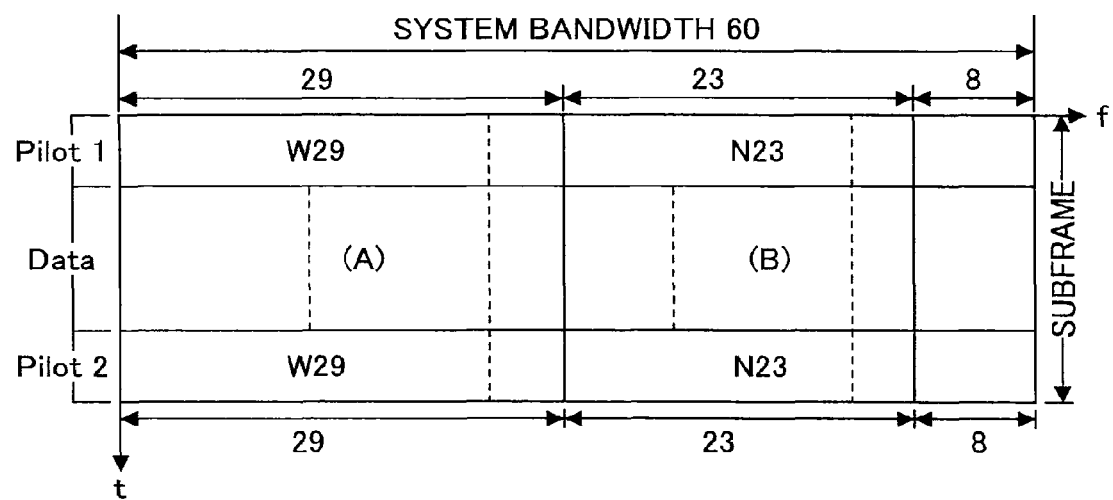

In FIGS. 7A and 7B, the bandwidths of data signals are adjusted to equal the sequence lengths of pilot signals. In FIG. 7A, the sequence lengths of pilot signals are determined based on RBs. When the bandwidth of each of RBs is 12, the smallest prime number exceeding the RB bandwidth is 13 and the largest prime number within the RB bandwidth is 11. In this case, data signal bandwidths of 13 and 11 are assigned to users A and B, respectively. Also, sequence lengths of W13 and N11 are assigned to the pilot signals of users A and B, respectively. This makes it possible to efficiently use the sum of the bandwidths (13+11=24) of RB1 and RB2. Also, this mapping scheme makes it possible to use all the symbols of pilot signals for channel estimation. RB3 and RB4 can be handled in substantially the same manner as described above. For the last one (RB5) of RBs, pilot signals with a sequence length of N11 are used.

In FIG. 7B, the sequence lengths of pilot signals are determined based on data signal bandwidths assigned to users. When the data signal bandwidth that is normally assigned to each of users A and B is 24, the smallest prime number exceeding the data signal bandwidth is 29 and the largest prime number within the data signal bandwidth is 23. The sum of the prime numbers becomes 52. In this case, data signal bandwidths of 29 and 23 are assigned to users A and B, respectively. Also, sequence lengths of W29 and N23 are assigned to the pilot signals of users A and B, respectively. This makes it possible to efficiently use the bandwidth of 52 for the pilot signals and the data signals without leaving space. Meanwhile, it is also possible to assign a data signal bandwidth of 23 to user A and a data signal bandwidth of 29 to user B. Also, a data signal bandwidth of 7 (out of the remaining bandwidth of 8) may be assigned to user C (not shown).

Figure 8:
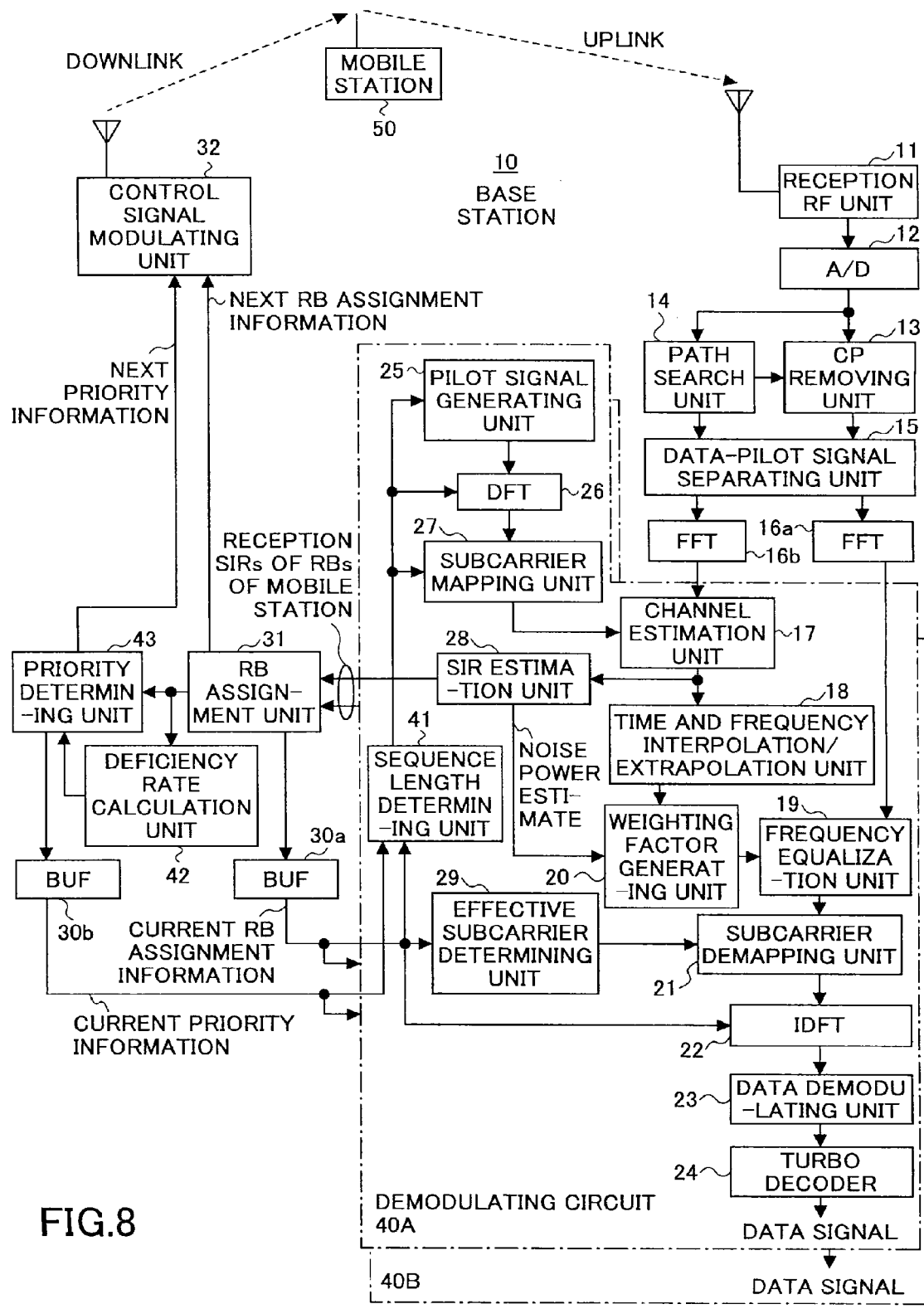
FIG. 8 is a block diagram illustrating an exemplary configuration of an exemplary receiving unit of a base station according to a second embodiment of the present invention.
Figure 9:
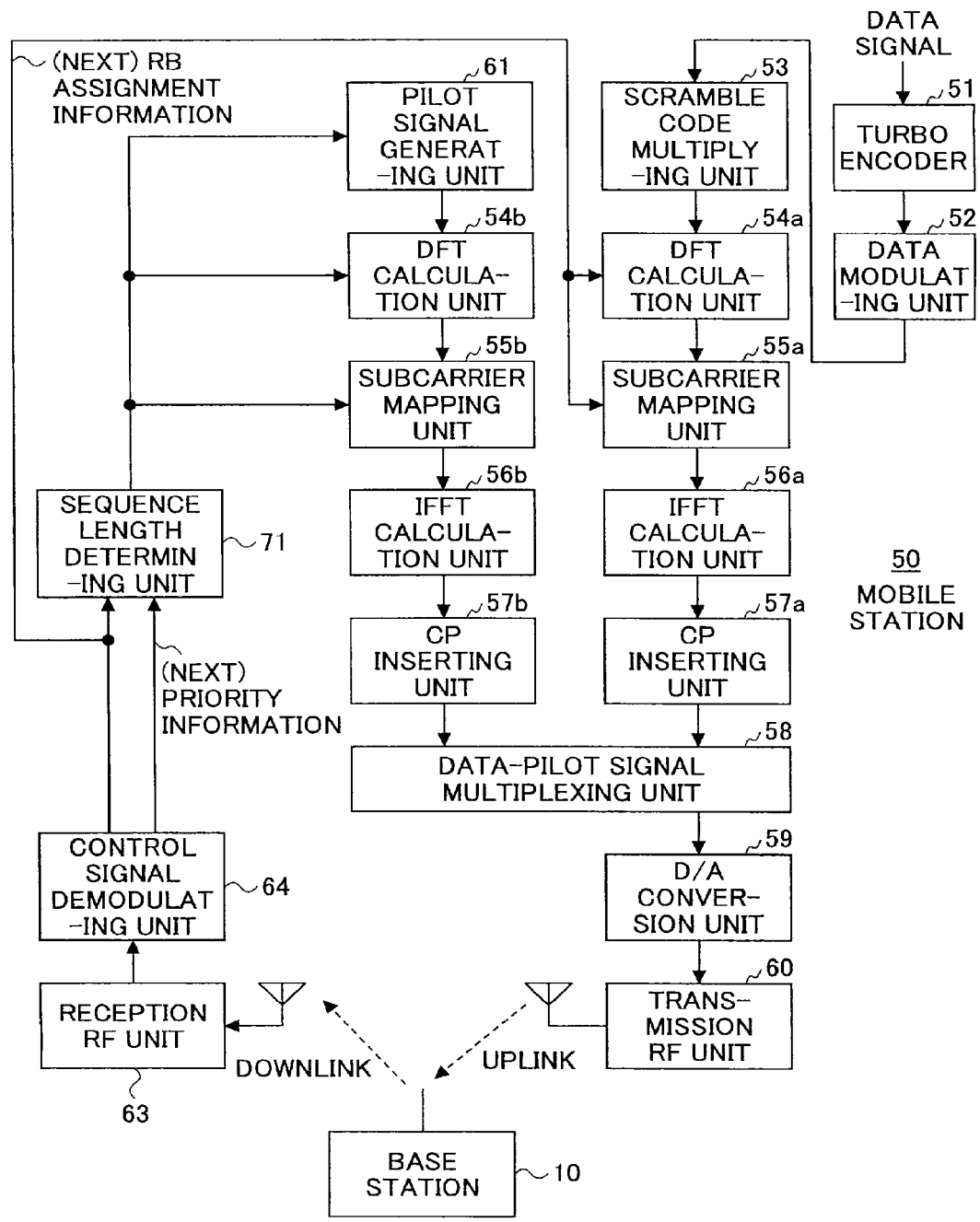
FIG. 9 is a block diagram illustrating an exemplary configuration of an exemplary transmitting unit of a mobile station according to the second embodiment of the present invention.

FIG. 8 and FIG. 9 are drawings illustrating another exemplary mobile communication system according to a second embodiment of the present invention. In this exemplary mobile communication system, priority information for determining the sequence length of pilot signals is used in addition to RB assignment information in order to more efficiently and flexibly perform pilot signal mapping. FIG. 8 is a block diagram illustrating an exemplary configuration of an exemplary receiving unit of a base station 10. The exemplary receiving unit of the base station 10 includes, in addition to the components shown in FIG. 1, a deficiency rate calculation unit 42 that calculates the deficiency rate of a bandwidth assignable to a pilot signal (pilot signal bandwidth deficiency rate); a priority determining unit 43 that determines the priority used to determine the sequence length of a pilot signal based on the deficiency rate and generates priority information; and a buffer 30b that retains (delays) the next priority information to be fed back to a mobile station 50 so that the next priority information can be used as the current priority information used to process a subframe signal received from the mobile station 50.

FIG. 9 is a block diagram illustrating an exemplary configuration of an exemplary transmitting unit of the mobile station 50. The exemplary transmitting unit of the mobile station 50 includes, in addition to the components shown in FIG. 2, a sequence length determining unit 71 that determines a sequence length (bandwidth) of a pilot signal based on the next RB assignment information and the next priority information sent from the base station 10.

The priority determining unit 43 shown in FIG. 8 generates priority information, which is used to determine the sequence length of a pilot signal, for each of the data signal bandwidths assigned to users.

The priority information is basically determined based on the deficiency rate of a bandwidth usable by a pilot signal (pilot signal bandwidth deficiency rate) in relation to the bandwidth of a data signal.

Figure 10A:
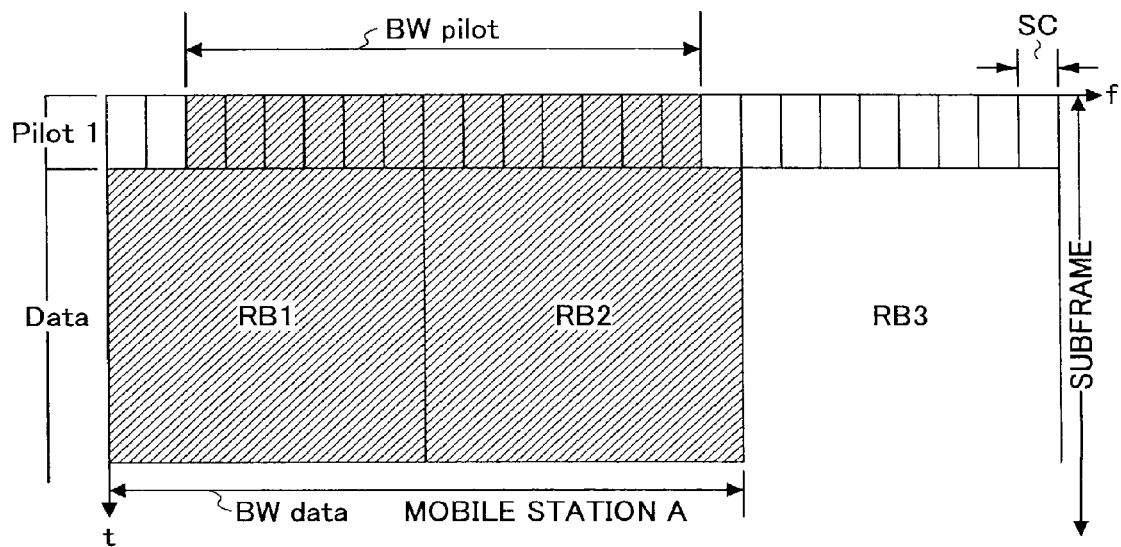
FIGS. 10A and 10B are drawings used to describe the deficiency rate of a bandwidth usable by a pilot signal.
Figure 10B:
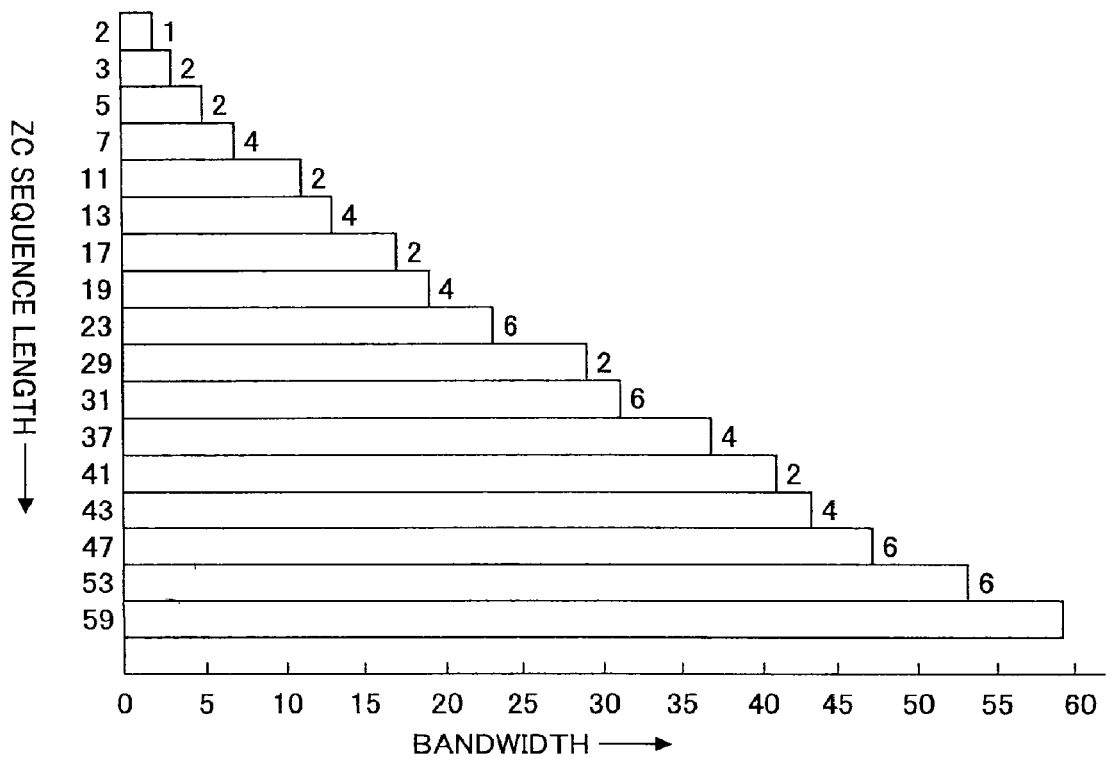
Figure 11A:
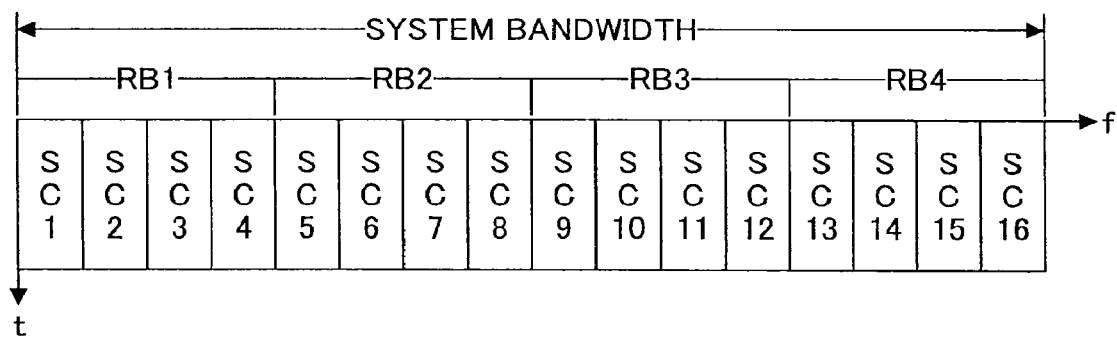
FIGS. 11A and 11B are drawings illustrating exemplary signal mappings in the frequency domain.
Figure 11B:
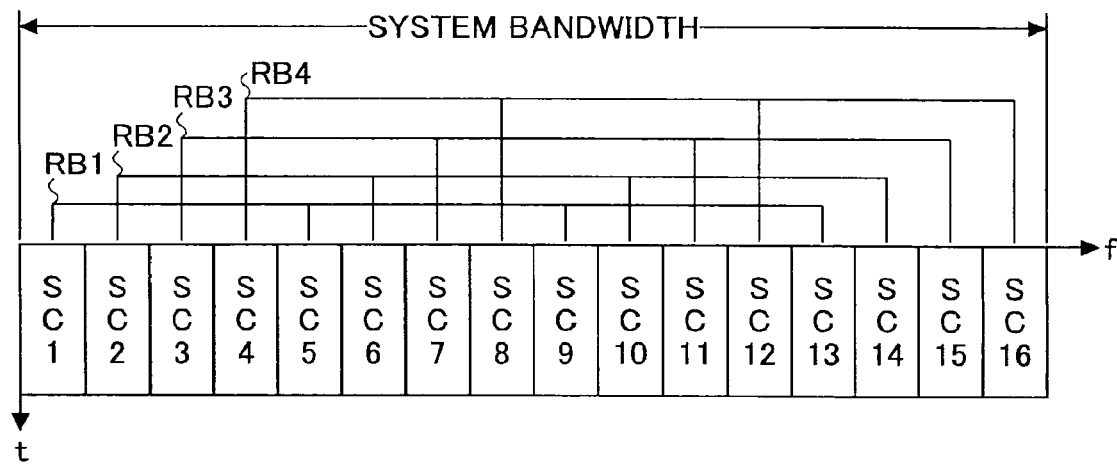
Figure 12:
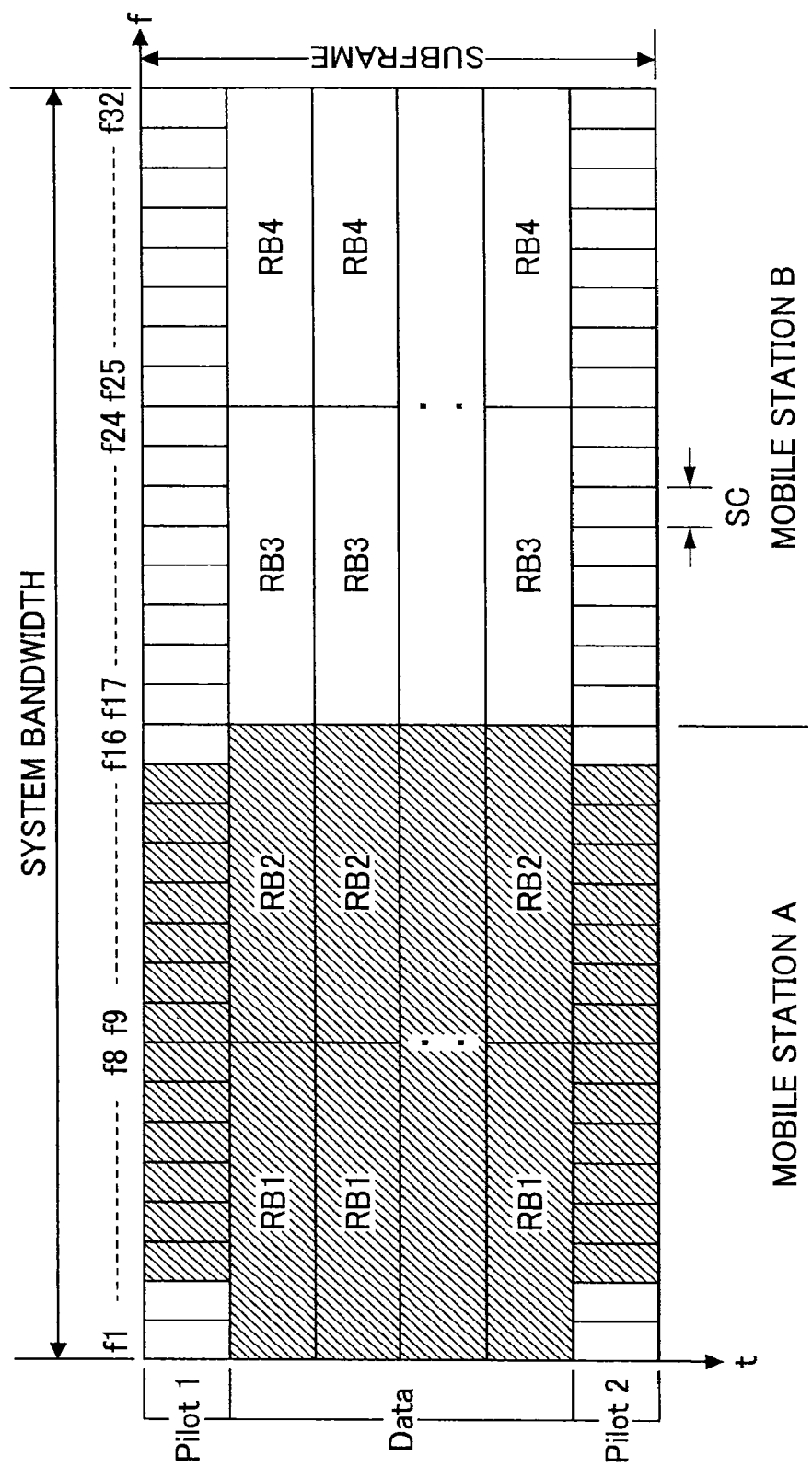
FIG. 12 is a drawing used to describe problems in a conventional technology.

FIGS. 10A and 10B are drawings used to describe the deficiency rate of a bandwidth usable by a pilot signal. When BWdata is the bandwidth of a data signal and BWpilot is the bandwidth of a pilot signal, a deficiency rate DR of the bandwidth usable for the pilot signal can be obtained by the following formula (4):

$$DR = \frac{BW_{data} - BW_{pilot}}{BW_{data}} = 1 - \frac{BW_{pilot}}{BW_{data}} \quad (4)$$

The largest prime number within the bandwidth of a data signal differs depending on the bandwidth of the data signal. A deficiency rate is used as a measure of the largest prime number.

Exemplary prime numbers (2-59) are shown in FIG. 10B. As shown in FIG. 10B, it can be assumed that the distribution of prime numbers in a set of natural numbers is substantially even. If so, it can be assumed that the deficiency rate of a bandwidth to be assigned to a pilot signal is substantially constant regardless of the number of RBs. Therefore, the deficiency rate of a bandwidth to be assigned to a pilot signal is in inverse proportion to the bandwidth of a data signal and can be approximated by the following formula (5):

$$DR \propto \frac{1}{BW_{data}} \quad (5)$$

In the exemplary range of prime numbers (2-59), the proportionality constant is between 2 and 6 (3.6 on average).

The priority determining unit 43 of the base station 10 sets the priority of a user (mobile station) with a high deficiency rate to high, the priority of a user with a medium deficiency rate to middle, and the priority of a user with a low deficiency rate to low. Such a prioritization method makes it possible to effectively prevent serious degradation of reception characteristics at the base station 10.

The mobile station 50 receives RB assignment information and priority information from the base station 10. When the priority is high, the mobile station 50 multiplexes a pilot signal (W) having a sequence length (bandwidth) that is larger than the bandwidth assigned to the data signal. When the priority is low, the mobile station 50 multiplexes a pilot signal (N) having a sequence length that is smaller than the bandwidth assigned to the data signal. When the priority is middle, the mobile station 50 alternately multiplexes a pilot signal (W) and a pilot signal (N). In other words, a user with a higher deficiency rate transmits a pilot signal having a wider bandwidth. Such a pilot signal transmission method makes it possible to effectively prevent serious degradation of the accuracy of channel estimation.

Also, the priority determining unit 43 is preferably configured to perform the priority determining process as described below taking into account the actual communication environment. For example, when the priorities of adjacent mobile stations are both high or both low, the priority determining unit 43 resets both of the priorities to middle. This makes it possible to impartially assign bandwidths to the mobile stations. When there is a possibility of pilot signal interference between adjacent mobile stations, the priority determining unit 43 resets the priority of one of the mobile stations that has a higher priority (high or middle) to low. This makes it possible to effectively prevent pilot signal interference. Also, the priority determining unit 43 sets the priority of a mobile station which is assigned a frequency band at an end of the system bandwidth to low. This makes it possible to safely prevent increase of adjacent frequency band emission. Further, the priority determining unit 43 sets the priority of a mobile station having a low modulation level to middle or low. Normally, a communication using a channel with a low modulation level shows comparatively good reception characteristics (such as low BER). Therefore, lowering the priority of a mobile station having a low modulation level does not greatly degrade the reception quality. This, in turn, makes it possible to increase the priority of an adjacent user.

In the above embodiments, an uplink communication in a mobile communication system is used as an example. However, the present invention may also be applied to other aspects of radio communication. For example, a pilot signal multiplexing method according to an embodiment of the present invention may also be applied to downlink communication. In the above embodiments, the sequence length and mapping of a pilot signal are determined at each mobile station based on RB assignment information from the base station. In other words, the RB assignment information is shared by the base station and the mobile station. However, a mobile communication system may be configured so that the base station determines the sequence length and mapping of a pilot signal for a mobile station and sends the information to the mobile station.

In the above embodiments, pilot signals are time-division multiplexed and placed at the top and bottom of a subframe. However, a different time-division multiplexing method may be used. For example, pilot signals may be arranged at certain intervals in a subframe.

Also, in the above embodiments, sequence lengths of pilot signals of two users are determined in one cycle of the exemplary sequence length determining process based on the combined bandwidth assigned to the two users. However, the present invention is not limited to the above embodiments. For example, the exemplary sequence length determining process may be configured to determine the sequence lengths of pilot signals of three users in one cycle. Further, in the above embodiments, methods of arranging signals within a system bandwidth are described. However, the present invention may also be applied to methods of arranging signals within the bandwidth of a cell.

As described above, embodiments of the present invention eliminate the need to extrapolate channel estimates in the frequency direction and thereby make it possible to obtain accurate channel estimates. Also, embodiments of the present invention make it possible to improve the flexibility in assigning pilot signals with low cross-correlation to each cell in a multicell environment.

The present invention is not limited to the specifically disclosed embodiments, and variations and modifications may be made without departing from the scope of the present invention.

The present application is based on Japanese Priority Application No. 2006-290881 filed on Oct. 26, 2006 with the Japanese Patent Office, the entire contents of which are hereby incorporated herein by reference.

What is claimed is:

1. A method of transmitting a pilot signal in a mobile communication system, comprising the steps of:

time-division multiplexing a pilot signal for channel compensation together with a data signal of a user, which data signal is assigned a certain bandwidth and to be wirelessly transmitted based on Discrete Fourier Transform-spread-Orthogonal Frequency Division Multiplexing (DFT-spread-OFDM), into a time-division multiplexed signal;

frequency-division multiplexing the time-division multiplexed signal together with time-division multiplexed signals of other users into a frequency- division multiplexed signal; and transmitting the frequency-division multiplexed signal; wherein the pilot signal of said user is composed of a sequence having a sequence length that is only a prime number; and the bandwidth assigned to the data signal of said user is adjusted to match a bandwidth corresponding to the sequence length of the pilot signal of said user.

2. A mobile communication system including a base station and at least one mobile station where a pilot signal for channel compensation is time-division multiplexed together with a data signal of the mobile station, which data signal is assigned a certain bandwidth and to be wirelessly transmitted between the base station and the mobile station based on Discrete Fourier Transform-spread-Orthogonal Frequency Division Multiplexing (DFT-spread-OFDM), into a time-division multiplexed signal, the time-division multiplexed signal is frequency-division multiplexed together with time-division multiplexed signals of other mobile stations in the mobile communication system into a frequency-division multiplexed signal, and the frequency-division multiplexed signal is transmitted, wherein the base station is configured to transmit information over a downlink control channel to the mobile station which information includes a bandwidth to be assigned to the data signal of the mobile station and a priority to determine a sequence length of the pilot signal at the mobile station; and the mobile station is configured to, when the priority is high, multiplex a first pilot signal composed of a sequence having a sequence length that is a smallest prime number exceeding the bandwidth assigned to the data signal of the mobile station.

3. A mobile communication system as including a base station and at least one mobile station where a pilot signal for channel compensation is time-division multiplexed together with a data signal of the mobile station, which data signal is assigned a certain bandwidth and to be wirelessly transmitted between the base station and the mobile station based on Discrete Fourier Transform-spread-Orthogonal Frequency Division Multiplexing (DFT-spread-OFDM), into a time-division multiplexed signal, the time-division multiplexed signal is frequency-division multiplexed together with time-division multiplexed signals of other mobile stations in the mobile communication system into a frequency-division multiplexed signal, and the frequency-division multiplexed signal is transmitted, wherein the base station is configured to transmit information over a downlink control channel to the mobile station which information includes a bandwidth to be assigned to the data signal of the mobile station and a priority to determine a sequence length of the pilot signal;

the mobile station is configured to, when the priority is high, multiplex a first pilot signal composed of a sequence having a sequence length that is a smallest prime number exceeding the bandwidth assigned to the data signal of the mobile station; and wherein, when the priority is low, the mobile station multiplexes a second pilot signal composed of a sequence having a sequence length that is a largest prime number within the bandwidth assigned to the data signal of the mobile station.

4. The mobile communication system as claimed in claim 3, wherein, when the priority is middle, the mobile station multiplexes the first pilot signal and the second pilot signal alternately along a time axis in such a manner that either of the first pilot signal and the second pilot signal does not overlap a pilot signal transmitted at the same timing from an adjacent one of the other mobile stations a data signal of which adjacent one of the other mobile stations is assigned a frequency band adjacent to that assigned to the data signal of the mobile station.

5. The mobile communication system as claimed in claim 4, wherein the base station is configured to obtain a pilot signal bandwidth deficiency rate of the mobile station by the following formula and, when the pilot signal bandwidth deficiency rate is high, to set the priority of the mobile station to high: [(bandwidth of data signal)-(bandwidth of pilot signal)]/(bandwidth of data signal).

6. The mobile communication system as claimed in claim 5, wherein, when the pilot signal bandwidth deficiency rate is low, the base station sets the priority of the mobile station to low.

7. The mobile communication system as claimed in claim 6, wherein, when the priority of the mobile station and the priority of the adjacent one of the other mobile stations are both high or both low, the base station resets both of the priority of the mobile station and the priority of the adjacent one of the other mobile stations to middle.

8. The mobile communication system as claimed in claim 7, wherein, when there is a possibility of pilot signal interference between the mobile station and the adjacent one of the other mobile stations, the base station resets one of the priorities of the mobile station and the adjacent one of the other mobile stations to low which one of the priorities is high.

9. The mobile communication system as claimed in claim 7, wherein the base station is configured to set the priority of the mobile station to low when a frequency band assigned to the data signal of the mobile station is located at an end of a bandwidth assigned to the mobile communication system.

10. The mobile communication system as claimed in claim 7, wherein the base station is configured to set the priority of the mobile station to low when a modulation level of the mobile station is low.

* * * * *